United States Patent [19]

Svochak et al.

[11] Patent Number: 5,724,120
[45] Date of Patent: Mar. 3, 1998

[54] MULTIFOCAL CONTACT LENS AND METHOD AND APPARATUS FOR MAKING THE SAME

[76] Inventors: Jan B. Svochak, 6432 Heather, Watauga, Tex. 76148; Colin Howard Wess, 4701 Canyon Trail North, Euless, Tex. 76040

[21] Appl. No.: 538,099

[22] Filed: Oct. 2, 1995

[51] Int. Cl.$^6$ .................................................. G02C 7/04
[52] U.S. Cl. .................................................. 351/161
[58] Field of Search ............................ 351/161, 168, 351/171, 169

[56] References Cited

U.S. PATENT DOCUMENTS

| | | | |
|---|---|---|---|
| 1,518,405 | 12/1924 | Glancy | 351/169 |
| 1,816,728 | 7/1931 | Glancy | 351/171 |
| 3,279,878 | 10/1966 | Long | 351/161 |
| 3,687,528 | 8/1972 | Maitenaz | 351/169 |
| 3,950,082 | 4/1976 | Volk | 351/169 |
| 4,324,461 | 4/1982 | Salvatori | 351/160 H |
| 4,618,229 | 10/1986 | Jacobstein et al. | 351/161 |
| 4,693,572 | 9/1987 | Tsuetaki et al. | 351/161 |
| 4,976,533 | 12/1990 | Hahn et al. | 351/160 R |
| 5,112,351 | 5/1992 | Christie et al. | 351/169 |
| 5,214,453 | 5/1993 | Giovanzana | 351/161 |
| 5,235,359 | 8/1993 | Chauveau et al. | 351/169 |
| 5,245,366 | 9/1993 | Svochak | 351/161 |
| 5,272,495 | 12/1993 | Pedrono | 351/169 |
| 5,296,880 | 3/1994 | Webb | 351/161 |
| 5,304,191 | 4/1994 | Gosselin | 606/172 |
| 5,517,260 | 5/1996 | Glady et al. | 351/161 |

*Primary Examiner*—David C. Nelms
*Assistant Examiner*—Jordan M. Schwartz
*Attorney, Agent, or Firm*—Needle & Rosenberg, P.C.

[57] ABSTRACT

A monocentric, multivision contact lens having a single optical axis and an anterior side. A first spherical vision surface is disposed on first portion of the anterior side and has a first radius of curvature and a first center of curvature disposed along the single optical axis. A second spherical vision surface is disposed on a second portion of the anterior side and has a second radius of curvature and a second center of curvature disposed along the single optical axis. A transition surface is disposed intermediate the first portion and the second portion and has a plurality of centers of curvature disposed along the single optical axis. A method of making a monocentric contact lens and a mandrel for mounting a lens on a lathe for producing a monocentric contact lens are disclosed.

11 Claims, 8 Drawing Sheets

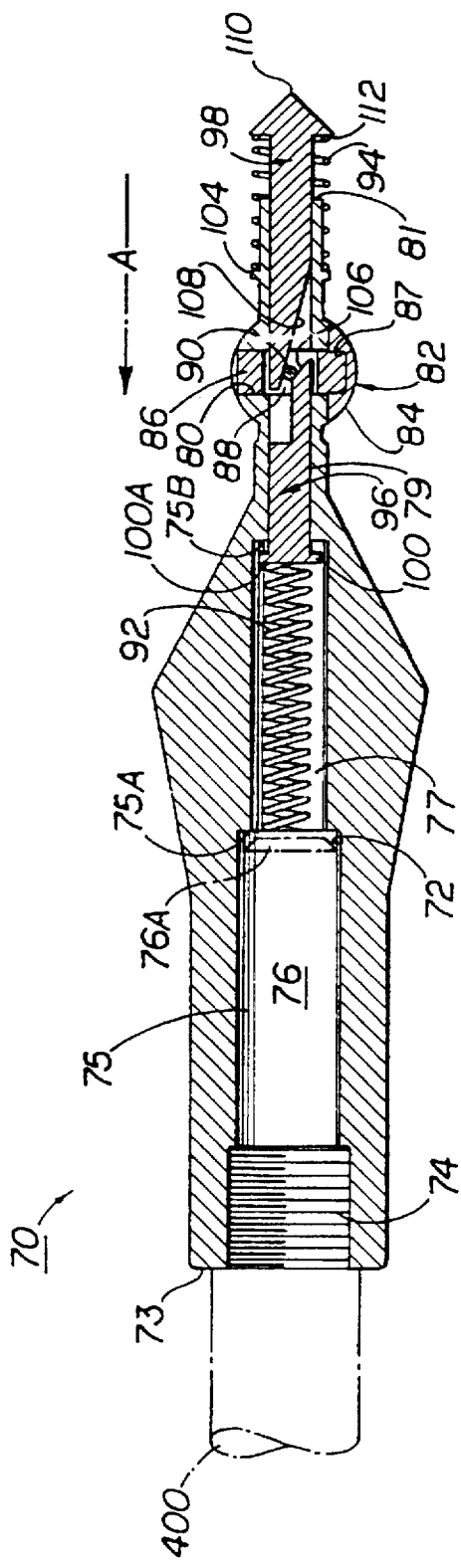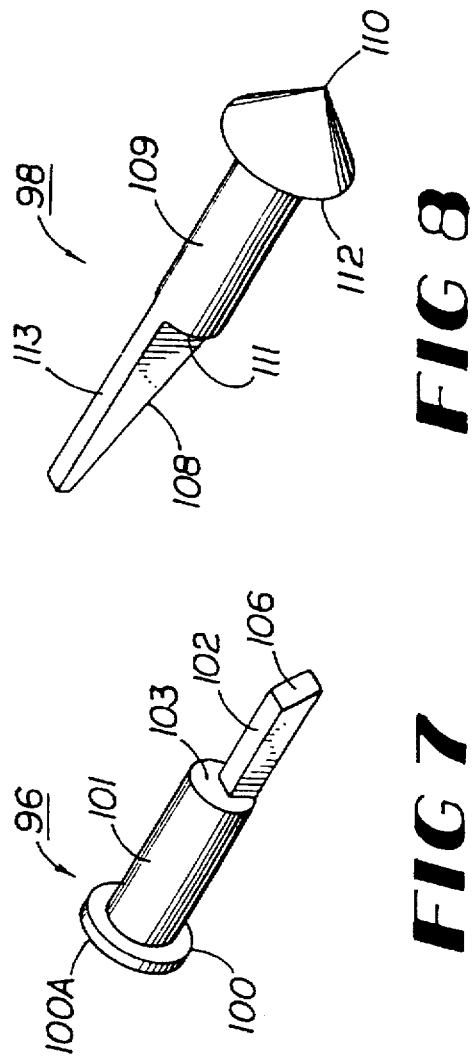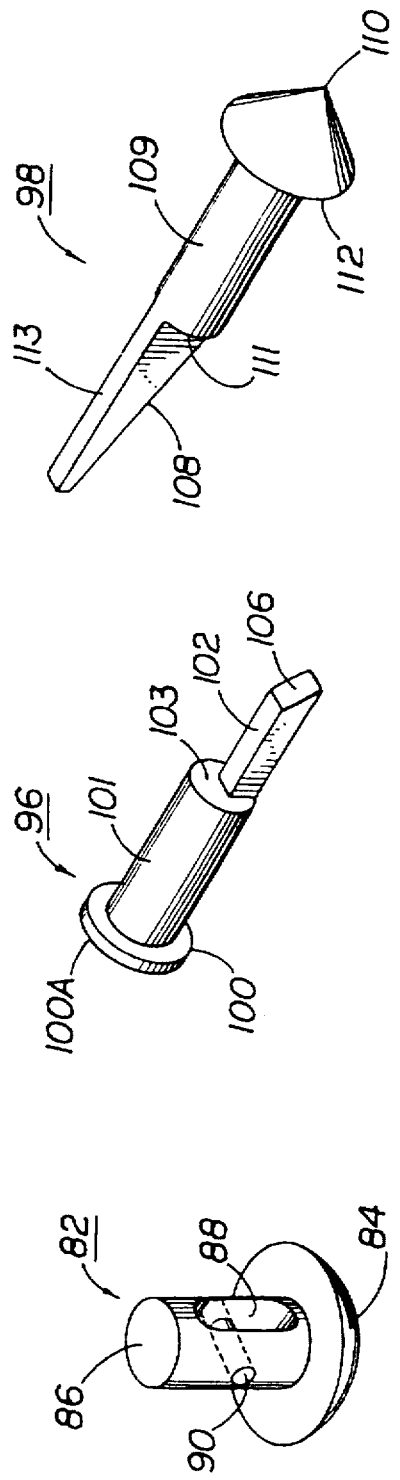

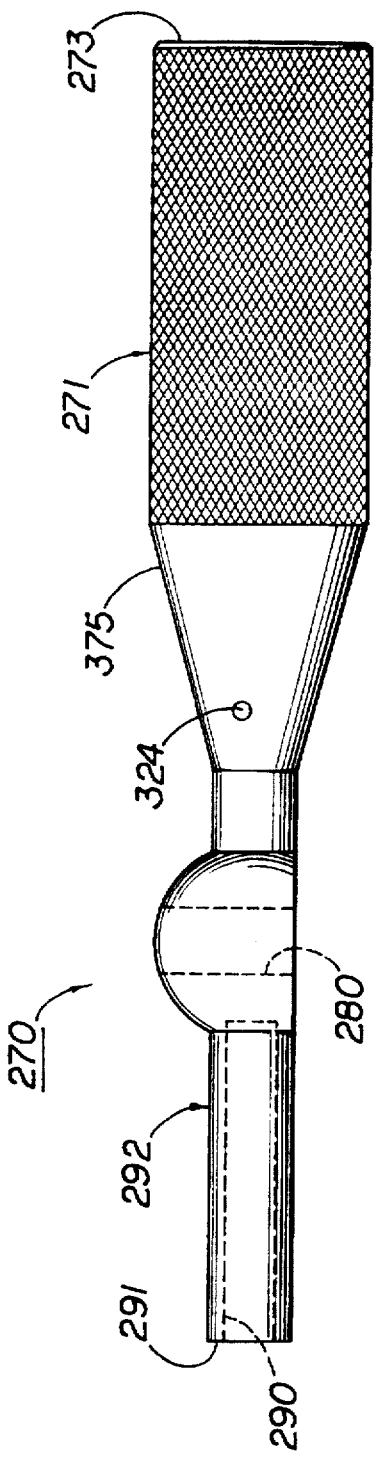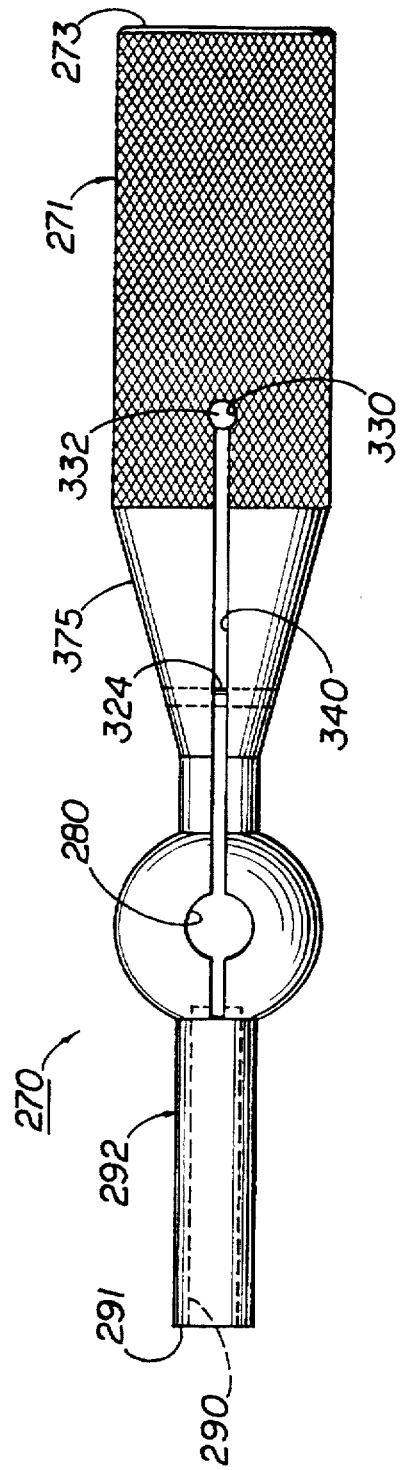

MULTIFOCAL CONTACT LENS AND METHOD AND APPARATUS FOR MAKING THE SAME

BACKGROUND OF THE INVENTION

1. Technical Field

The present invention relates to contact lenses and in particular to multifocal contact lenses and a method and apparatus for making the same.

2. The Prior Art

Contact lenses are widely used for many different types of vision deficiencies. These include defects such as near-sightedness and far-sightedness (myopia and hypermetropia, respectively), and defects in near range vision usually associated with aging (presbyopia). Presbyopia occurs as a person ages when the lens of eye begins to crystalize and lose its elasticity, eventually resulting in the eye losing the ability to focus on nearby objects.

Some presbyopic persons have both near vision and far vision defects, requiring bifocal lenses to properly correct their vision. For cosmetic reasons, many people prefer wearing contact lenses to correct their vision rather than bifocal eye glasses.

A typical single vision contact lens has a focus, which is the point on which parallel rays of light focus when the lens is placed perpendicular to the parallel rays, and an optical axis, which is an imaginary line drawn from the focus to the center of the lens. A posterior surface fits against the cornea and an opposite anterior surface has a vision surface that focuses light to correct the eye's vision. In the case of a typical spherical lens, the vision surface has a single radius of curvature that is the distance from any point on the vision surface to a point on the optical axis referred to as the center of curvature. A bifocal lens has at least two vision surfaces on the anterior surface of the lens. If the centers of curvature of the two vision surfaces both lie on the same optical axis, then the lens is termed "monocentric." Monocentric lenses are preferable to non-monocentric lenses because monocentric lenses do not cause vision "jumps" as the eye moves from looking through one vision surface to the other, unlike non-monocentric lenses.

Several examples of bifocal contact lenses exist in the prior art. Present methods for producing these lenses include machining the front of these lenses to produce two or more vision surfaces in the lenses. By doing so, a ledge is formed between the distance vision surface and the near vision surface. Such a ledge causes the wearer discomfort during blinking and can collect debris, which further increases the possibility of eye infection and decreases the life of the lens. Furthermore, these types of lenses are manufactured by repositioning the lens between cuts, which increases the possibility of optical inaccuracies and deviations from the optical axis. Such lenses include lenses disclosed in U.S. Pat. No. 5,245,366, issued to Svochak, and in U.S. Pat. No. 5,296,880, issued to Webb. The lenses in these patents contain a ledge resulting from repositioning of the lenses during machining of the interior surfaces of the lens. The ledge in these lenses represent a sagittal difference in radii between a flat and a steep radius.

Junctionless bifocal contact lenses are also manufactured, but typically lenses in this category are not monocentric and thus result in a wearer experiencing an image jump between the near and distance portions. Current junctionless bifocal contact lenses rely on the patient's ability to suppress out-of-focus images because the lenses do not provide the patient distance, near, and intermediate ranges without distracting vision jumps.

SUMMARY OF THE INVENTION

The present invention is a contact lens formed from a material having a single index of refraction and having a single optical axis, an anterior side and an opposite posterior side adapted to fit against a human cornea. A first spherical vision surface, such as a distance vision surface, is laterally disposed on a first portion of the anterior side and has a first radius of curvature and a first center of curvature disposed along the single optical axis. A second spherical vision surface, such as a near vision surface, is laterally disposed on a second portion of the anterior side and has a second radius of curvature and a second center of curvature disposed along the single optical axis. An aspherical transition surface is laterally disposed on a third portion of the anterior side intermediate the first portion and the second portion and has a plurality of centers of curvature, with each center of curvature being disposed along the single optical axis. The transition surface, which interconnects the first spherical vision surface and the second spherical vision surface, comprises a plurality of radii of curvature that continuously vary in length from the first center of curvature to the second center of curvature.

In an alternate embodiment, the present invention comprises a plurality of laterally disposed spherical vision surfaces, with each spherical surface having a center of curvature disposed on the single optical axis. It also comprises a plurality of laterally disposed aspherical transition surfaces with each transition surface interconnecting a pair of the spherical vision surfaces and each transition surface having a center of curvature disposed on the single optical axis.

In another alternative embodiment, the present invention comprises a contact lens having an aspherical vision surface disposed on the anterior side. The aspherical vision surface has a plurality of centers of curvature, with each center of curvature disposed along the single optical axis.

The present invention also comprises a method of making a contact lens having a single optical axis from a lens blank. The steps of the method include first mounting the lens blank on a mandrel having an is of rotation, so that the single optical axis of the lens blank is perpendicular to the axis of rotation of the mandrel. The mandrel is then mounted on a lathe. A first vision surface, having a first radius of curvature, is cut laterally along a first portion of the anterior side as the mandrel and lens blank rotate so that the first vision surface has a first center of curvature disposed along the single optical axis. A second vision surface, having a second radius of curvature, is cut laterally along a second portion of the anterior side as the mandrel and lens blank rotate, so that the second vision surface has a second center of curvature disposed along the single optical axis. Also, a transition surface, having a plurality of radii of curvature, is cut laterally along a third portion of the anterior side so that the third vision surface has a plurality of centers of curvature each disposed along the single optical axis between the first and second centers of curvature as the mandrel and lens blank rotate.

The first, second and the transition surfaces are cut with a cutting tool that moves across the anterior side from the upper portion to the lower portion as the lens blank rotates around the axis of rotation. The changing of the radii of curvature is accomplished by changing the distance from the anterior side to the axis of rotation while also changing the distance from the cutting tool to the axis of rotation as the cutting tool moves across the anterior side.

Two embodiments of a mandrel are disclosed, the lens to be cut being mounted on the mandrel. The different embodiments relate to the mechanisms for presenting the lens to the cutting tool.

For the purpose of marking the lens, a ridge may be disposed laterally along a portion of the anterior side. For example, if the first vision surface and the transition surface are joined at a first interface, the ridge may be disposed along the first interface. Similarly, if the second vision surface and the transition surface are joined at a second interface, the ridge may be disposed along the second interface. The ridge does not form a ledge and can be eliminated by altering the proportion at which the cutting tool moves relative to the lens blank. This ridge typically occurs when using a cutting tool having a rounded tip diagram. Therefore, the ridge may be eliminated by using a pointed tip rather than a rounded tip on the cutting tool.

It is an object of the present invention to manufacture monocentric multifocal contact lenses.

It is a further object of the present invention to manufacture multifocal contact lenses free of ledges between the different vision surfaces.

It is a further object of the present invention to manufacture multifocal contact lenses that allow the eye to move between vision surfaces on the lenses without experiencing vision jumps.

These and other objects of the present invention will be disclosed fully in the detailed description that follows.

BRIEF DESCRIPTION OF THE FIGURES OF THE DRAWINGS

FIG. 5 is a vertical side elevational view of the mandrel used to manufacture the lens of the present invention.

FIG. 6 is a perspective view of a lens blank mounting member.

FIG. 7 is a perspective view of the first elongated member of the mandrel depicted in FIG. 5.

FIG. 8 is a perspective view of the second elongated member of the mandrel depicted in FIG. 5.

FIG. 10A is a side elevational view of an alternative embodiment of the mandrel with the lens blank mounting member in the extended position.

FIG. 10B is a top view of an alternative embodiment of the mandrel with the lens blank mounting member in the retracted position.

DETAILED DESCRIPTION OF THE ILLUSTRATIVE EMBODIMENTS

Figure 1:
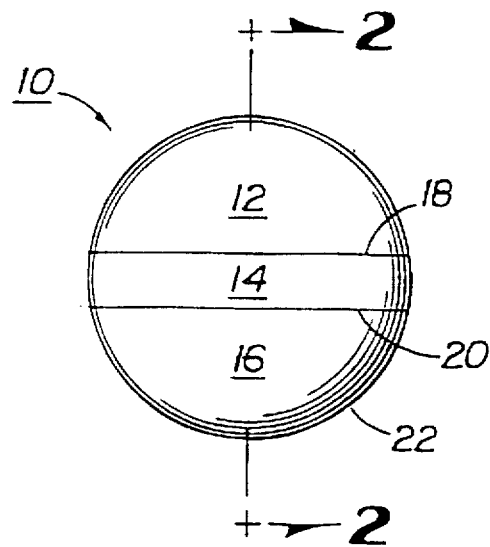
FIG. 1 is a front elevational view of a contact lens depicted according to the present invention.

The invention is now described in detail. Referring to the drawings, like numbers indicate like parts throughout the views. As used in the description herein and throughout the claims that follow, "a,""an," and "the" includes plural reference unless the context clearly dictates otherwise.

A. The Lens

Referring to FIG. 1, the multifocal contact lens 10 of the present invention includes a spherical distance vision surface 12, an aspherical transition surface 14, and a spherical near vision surface 16. The distance vision surface 12 meets the transition surface 14 along a juncture 18. The transition surface 14 also meets the near vision surface 16 along a juncture 20. These surfaces are contained within a radial edge 22 of the multifocal contact lens 10.

Figure 2:
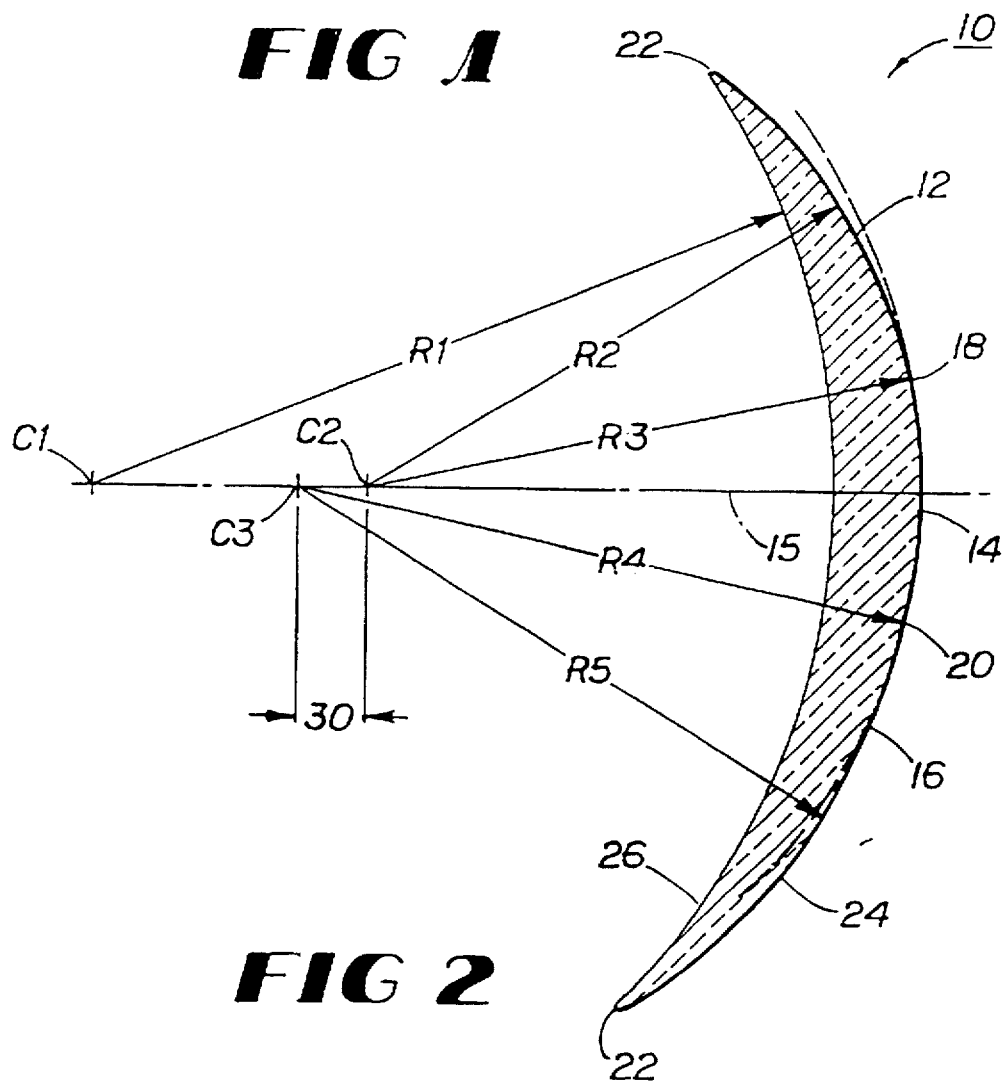
FIG. 2 is a vertical sectional view of the contact lens taken along line 2—2 in FIG. 1.

Referring to FIG. 2, a bifocal lens 10 in accordance with the present invention includes an anterior surface 24 and a posterior surface 26. The posterior surface 26 is formed on a radius of curvature R1 having a center of curvature C1. The distance vision surface 12 has a radius of curvature R2 and a center of the curvature C2 disposed along a single optical axis 15. The near vision surface 16 has a radius of curvature R5 and a center of curvature C3, also disposed along the single optical axis 15. Disposed between the distance vision surface 12 and the near vision surface 16 is a transition surface 14. The transition surface 14 is contained between juncture 18 and juncture 20 and has a plurality of radii of curvature that continuously vary from radius R3 (which is equal to the radius R2 of the distance vision surface 12) to radius R4 (which is equal to the radius R5 of the near vision surface 16). Also, the transition surface 14 has a plurality of centers of curvature 30 that are disposed along the single optical axis 15 between center of curvature C2 and center of curvature C3.

Figure 3:
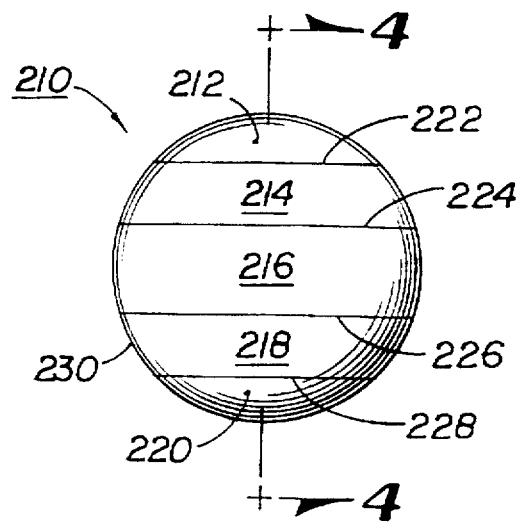
FIG. 3 is a from elevational view of a trifocal contact lens.

The lens of the present invention may comprise several vision surfaces in alternative embodiments. For example, referring to FIG. 3, a trifocal contact lens 210 includes a first spherical vision surface 212, a first aspherical transition surface 214, a second spherical vision surface 216 a second aspherical transition surface 218, and a third spherical vision surface 220. The first vision surface 212 meets the first transition surface 214 along a juncture 222. The first transition surface 214 meets the second vision surface 216 along a juncture 224. The second vision surface 216 meets the second transition surface 218 along a juncture 226 and the second transition surface 218 meets the third vision surface 220 along a juncture 228. These surfaces are contained within a radial edge 230 of the trifocal contact lens 210. As would be obvious to one skilled in the art, the vision surfaces and the transition surfaces could be disposed laterally, disposed vertically or could have other orientations on the anterior surface 24.

Figure 4:
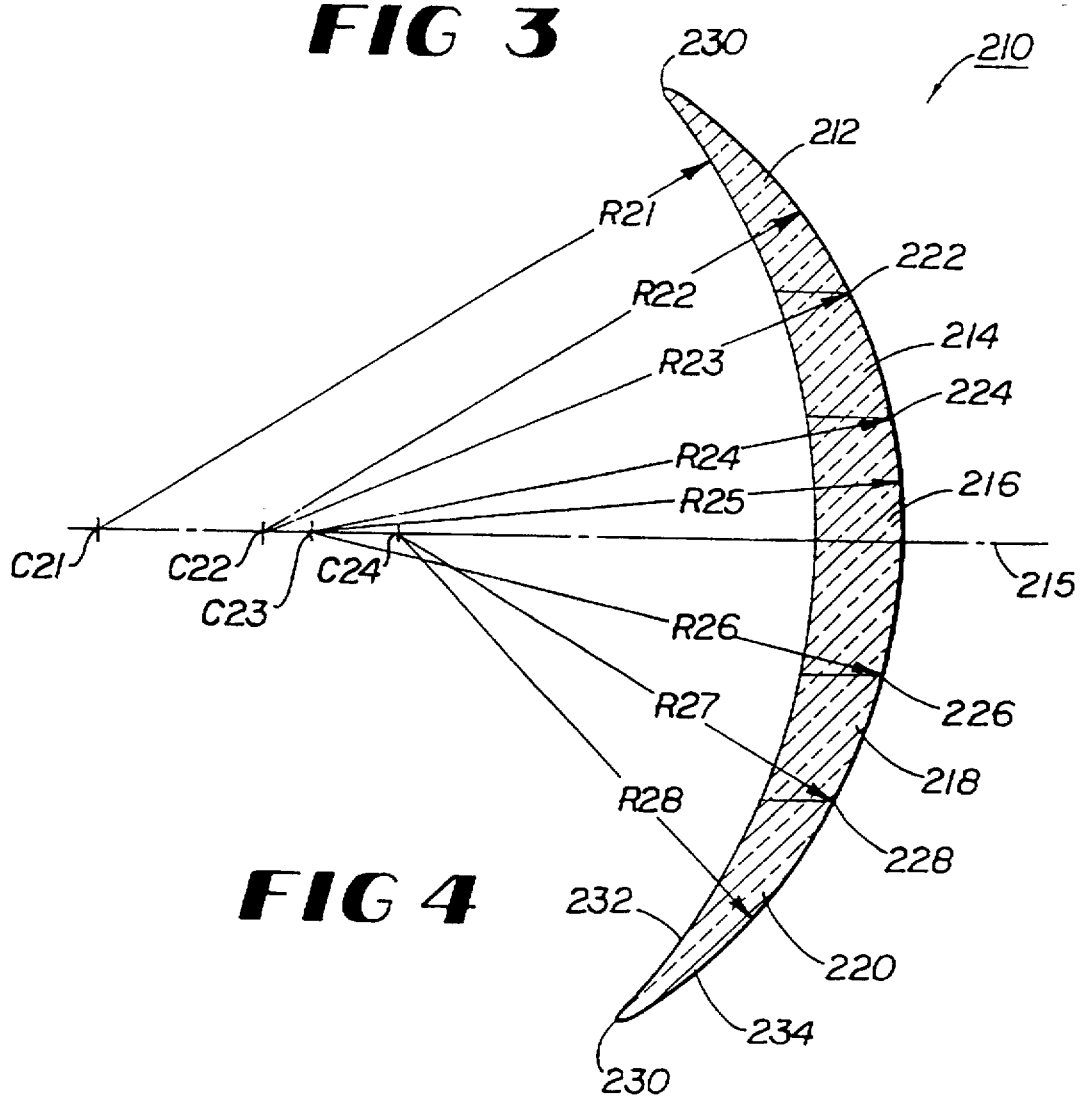
FIG. 4 is a vertical sectional view of the trifocal contact lens taken along line 3—3 in FIG. 3.

Referring to FIG. 4, the trifocal lens 210 includes an anterior surface 234 and a posterior surface 232. The posterior surface 232 is formed on a radius of curvature R21 having a center of curvature C21. The first vision surface 212 has a radius of curvature R22 and a center of the curvature C22 disposed along a single optical axis 215. The second vision surface 216 has a radius of curvature R25 and a center of curvature C23, also disposed along the single optical axis 215. Disposed between the first vision surface 212 and the second vision surface 216 is the first transition surface 214. The first transition surface 214 is contained between juncture 222 and juncture 224 and has a plurality of radii of curvature that continuously vary from radius R23 (which is equal to the radius R22 of the first vision surface 212) to radius R24 (which is equal to the radius R25 of the second vision surface 216). The third vision surface 220 also has a radius of curvature R28 and a center of curvature C24 disposed along the single optical axis 215. Disposed between the second vision surface 216 and the third vision surface 220 is the second transition surface 218. The second transition surface 218 is contained between juncture 226 and juncture 228 and has a plurality of radii of curvature that continuously vary from radius R26 (which is equal to the radius R25 of the second vision surface 216) to radius R27 (which is equal to the radius R28 of the third vision surface 220). As would be obvious to one skilled in the art, the present invention may include even more spherical vision surfaces joined by a respective number of aspherical transition surfaces.

B. First Embodiment of the Mandrel

FIG. 5 depicts a longitudinal sectional view of a mandrel 70 used to manufacture the contact lens of the present invention. The mandrel 70 has a bore 72 longitudinally extending therethrough which becomes smaller in diameter from bottom 73 to tip 110 as it progresses from a first cylindrical portion 75 to a second or intermediate cylindrical portion 77 and then to a third cylindrical portion 79. The bore 72 contains threads 74 adjacent the bottom 73 that are configured to couple the mandrel 70 to a lathe 400 upon which the lens 10 is cut. Disposed in the first portion 75 of the bore 72 is a chuck 76; a first spring 92 is within the second portion 77; and a first elongated member 96 is disposed within the third portion 79. The transition between the first portion 75 with its diameter and reduced diameter second portion 77 is a ledge portion 75A which engages the top 76A of the chuck 76. The top 76A provides compressive force on one end of the first spring 92, which in turn provides outward force on the first elongated member 96.

The first elongated member 96 is depicted more clearly in FIG. 7 and comprises a cylindrical body portion 101 having at its rear end a flange 100 with a bottom face 100A which engages the other end of the spring 92. The forward end of the body portion terminates in a first face 103 having a first projection 102 longitudinally extending therefrom, the projection 102 terminating in a first oblique camming surface 106.

Returning to FIG. 5, the mandrel 70 also defines a transverse bore 80, perpendicular to and in communication with the third portion 79 and in communication with an open end 81, for receiving a lens blank mounting member 82. The lens blank mounting member 82 is shown more clearly in FIG. 6 and includes a plastic hemisphere 84, having a cylindrical portion 86 upwardly projecting from its flat rear surface 85. The member 82 is movable between an extended position wherein the cylindrical portion 86 is substantially out of the bore 80 and a retracted position wherein the cylindrical portion 86 is substantially within the bore 80. The member 82 includes a vertically elongated aperture 88 passing laterally through the cylindrical portion 86 with a horizontally disposed cam follower shaft 90 extending through the cylinder portion 86 at right angles to the aperture 88. As seen in FIG. 5, the hemisphere 84 has a longitudinally extending threaded cavity 87 for fastening therein the complimentary threaded bottom of the cylindrical portion 86. The transverse bore 80 is configured to slidably receive the cylindrical portion 86 of the lens blank mounting member 82.

Disposed substantially within the bore 80 and extending out of the open end 81 of the third portion 79 is a second elongated member 98 which, as seen in more detail in FIG. 8, has a second cylindrical body portion 109 having a second face 111 with a second projection 113 longitudinally extending therefrom and terminating in a second camming surface 108, which is complimentary in shape to the first camming surface 106. The end of the body portion 109 opposite the face 111 terminates in a biasing tip 110, the transition between the body portion 109 and the tip 110 being a second shoulder 112. Returning to FIG. 5, a second spring 94 is biased between a flange 104 circumferentially extending about the exterior surface of the mandrel 70 and the second shoulder 112.

The first elongated member 96 and the second elongated member 98 are disposed within the third portion 79 so that the first projection 102 with the first camming surface 106 and the second projection 113 with the second camming surface 108 fit within the aperture 88 of the lens blank mounting member 82, with each camming surface 106, 108 slidably engaging the top and bottom, respectively, of the shaft 90 in a complimentary fashion.

In operation, as compressive force is placed on the biasing tip 110 in the direction of arrow A, the elongated members 96, 98 are forced in the direction of arrow A. The shaft 90 is pushed outward from the axis of rotation of the mandrel 70, thereby increasing the radius between the axis of rotation of the mandrel 70 and the plastic hemisphere 84 of lens blank mounting member 82, urging the hemisphere 84 into an extended position and thus increasing the radius of curvature of the lens being cut on the lathe 400. Similarly, when the compressive force is released from the biasing tip 110, the springs 92, 94 push the elongated members 96, 98 in the direction opposite arrow A. The camming surfaces 106, 108 then force the shaft 90 inward toward the axis of rotation of the mandrel 70, thereby moving the lens blank mounting member 82 towards a retracted position toward the axis of rotation.

The second camming surface 106 is more narrowly inclined than the first camming surface 108. The less narrowly inclined surface of the second camming surface 108 provides for more precise movement of the lens blank mounting member 82 when the biasing tip 110 of the elongated member 98 is biased in the direction of arrow A.

Figure 9A:
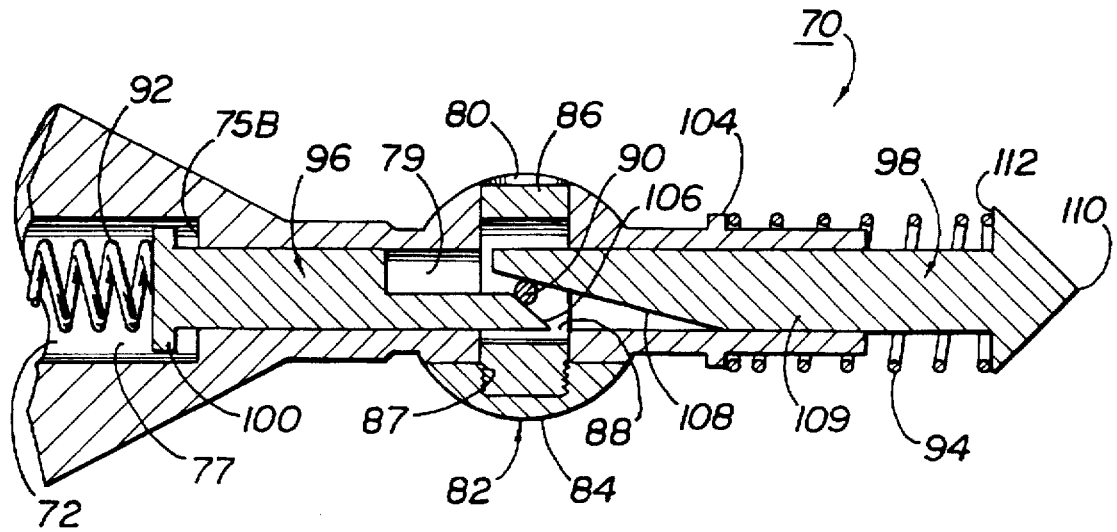
FIG. 9A is a vertical side elevational view of the front portion of the mandrel depicted in FIG. 5 with a lens blank in the retracted position.
Figure 9B:
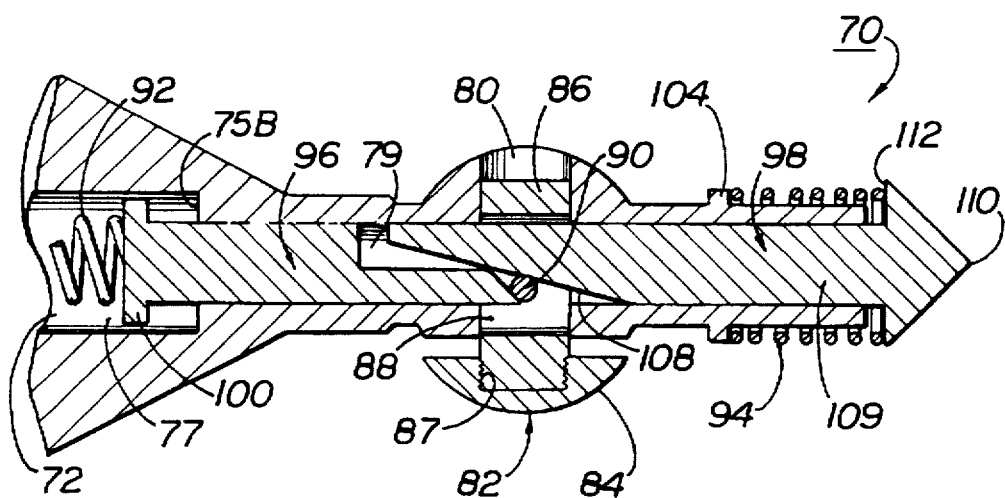
FIG. 9B is a vertical side elevational view of the front portion of the mandrel depicted in FIG. 5 with a lens blank in the extended position.

Referring to FIG. 9A, the mandrel 70 is depicted with the lens blank mounting member 82 in the retracted position. In FIG. 9B, the mandrel 70 is depicted with the lens blank mounting member 82 in the extended position.

C. Second Embodiment of the Mandrel

Referring to FIGS. 10A and 10B, an alternate embodiment of the mandrel 270 comprises a body portion 271 having a bottom end 273 securable to the lathe 400 and terminating in a middle tapered portion 275, which terminates in an elongated portion 292 having an open end 291. The portion 292 includes a vertical or transverse bore 280 which intersects a coaxial bore 272 extending from adjacent the transverse bore 280 toward end 291. As shown in FIG. 10B, a longitudinal slot 340 extends from the body portion 271 through the transverse bore 290.

Figure 11A:
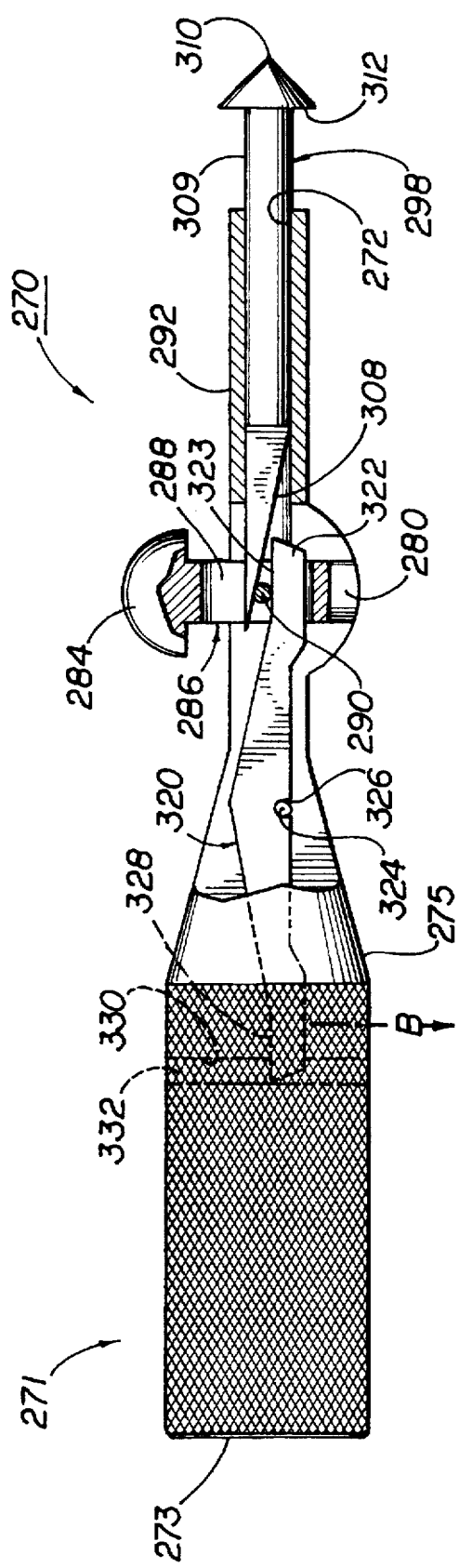
FIG. 11A is a vertical side view of the alternative embodiment of the mandrel depicted in FIGS. 10A and 10B.
Figure 11B:
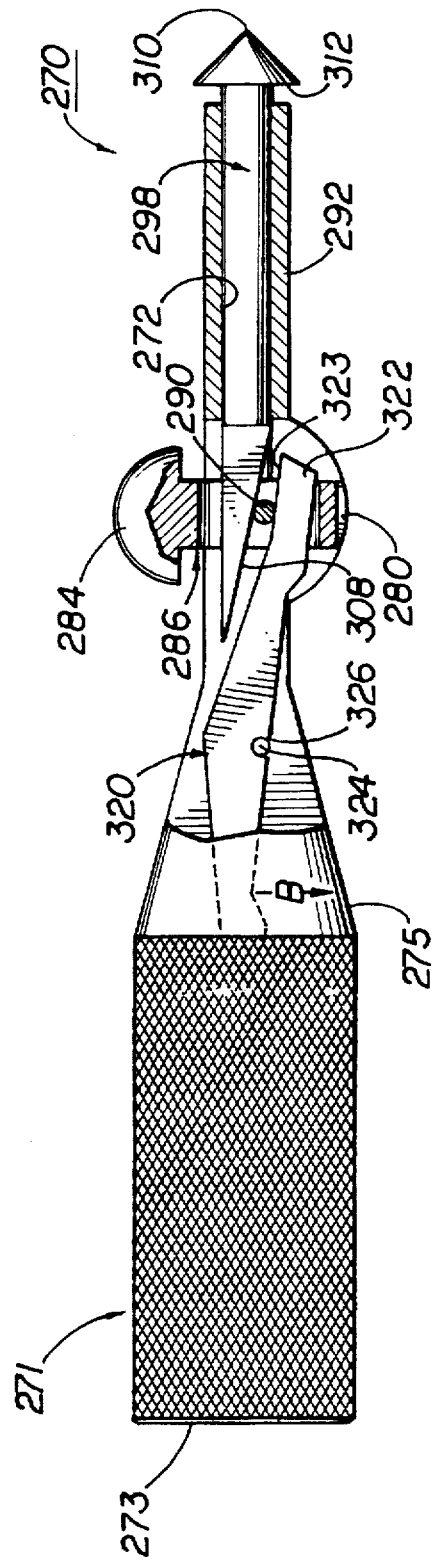
FIG. 11B is a vertical side view of the alternative embodiment of the mandrel depicted in FIGS. 10A and 10B.

Referring to FIGS. 11A and 11B, a lens blank mounting member 286 is slidably received in the transverse bore 280 and includes an elongated opening 288 therethrough in which is horizontally disposed a cam follower shaft 290. An elongated member 298 is slidably received in the coaxial bore 272. The forward end of the elongated member 298 terminates in a shoulder 312 and an adjacent biasing tip 310 disposed outside of the body portion 271. The rear end of member 298 has a camming surface 308 which engages the top of the shaft 290. A rocking arm member 320 is pivotally mounted about rod 324 within the slot 340 and has a rear end 328 and an opposite forward end 322. A portion of end 322 is disposed within the elongated aperture 288 of the lens blank mounting member 286 and has a top flat bearing surface 323 engaging the bottom of the cam follower shaft 290.

FIG. 11A depicts the mandrel 270 "at rest" with the rear end 328 of member 320 being biased downwardly in the direction of arrow B by means of a spring (not shown). That causes the surface 323 to push upwardly on shaft 290, lifting member 286 upwardly along bore 280. When a compressive force is applied to the biasing tip 310 in the direction of the bottom end 273, the camming surface 308 moves along the top of the cam follower shaft 290, pushing downwardly on the shaft 290 thereby retracting the lens blank mounting member 286, as shown in FIG. 11B. The downward movement of the shaft 290 on the surface 323 forces the end 322 of the rocking arm member 320 downward about rod 324 which urges end 328 upward against the spring (not shown).

D. The Lathe

Figure 12:
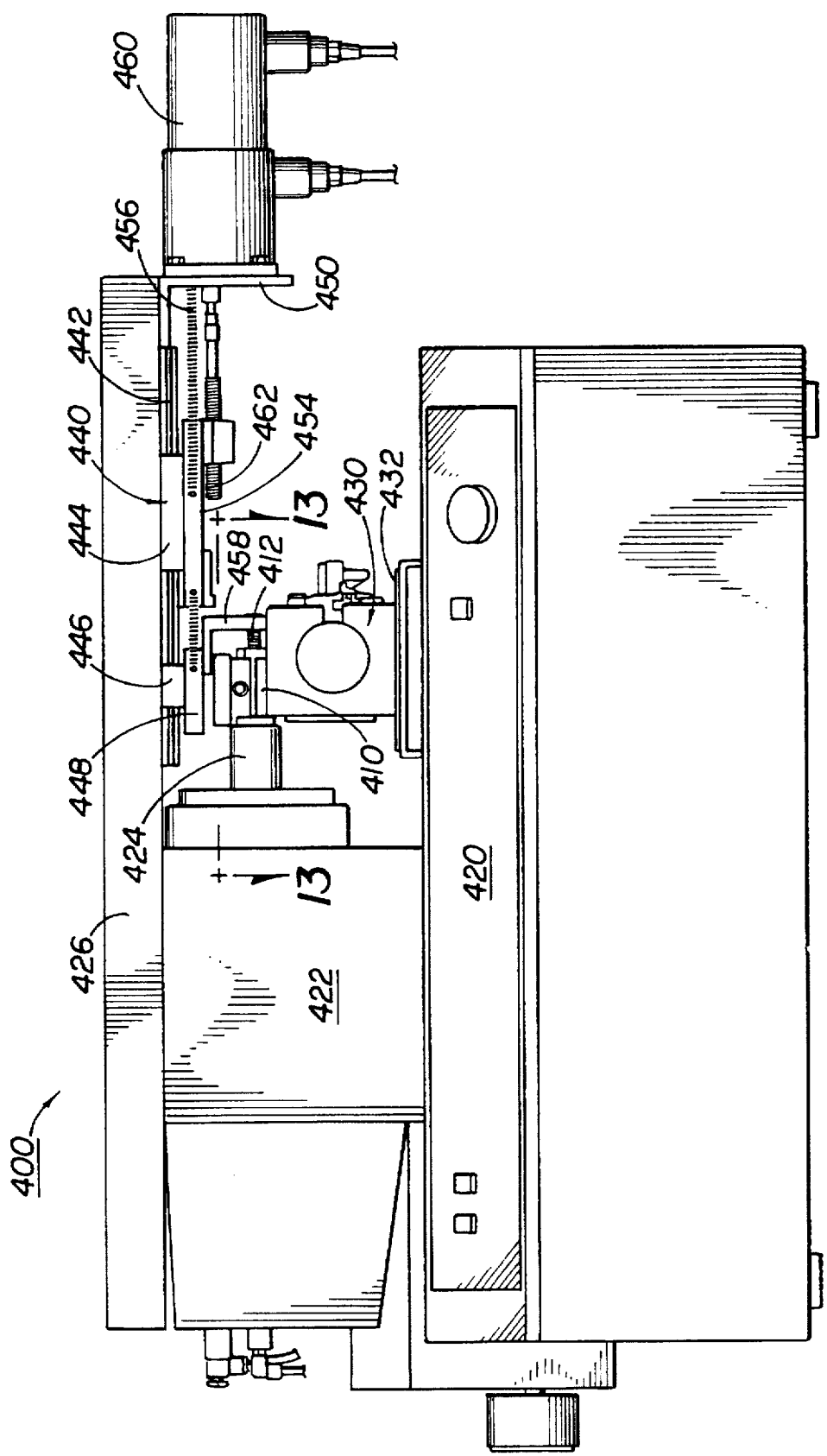
FIG. 12 is a front elevational view of a lathe according to the present invention.

FIG. 12 depicts a lathe 400 with which either embodiment of the mandrel 170 or 270 may be employed to create contact lenses according to the present invention. The lathe 400 may be of the type commonly available for producing contact lenses with several modifications to adapt it for producing lenses according to the present invention and includes a base 420 upon which a motor (not shown) is mounted within a housing 422 to rotate a head stock 424. A mandrel 410, having a biasing point 412, is secured on the head stock 424. A turret 430 is mounted upon a turn table 432, which is mounted on the base 420. A cutting tool (not shown) may be mounted on the turret 430.

Extending from the housing 422 is a support arm 426 supporting a bearing assembly 440. The bearing assembly 440 comprises a journal rod 442 slidably supporting a first linear bearing 444 and a precision bearing 446. The journal rod 442 abuts a base plate 450, which is affixed to the support arm 426. A floating block 448 is affixed to the precision bearing 446 and is coupled to a control block 454 by a spring 456. Affixed to the floating block 448 is an anvil 458. The spring 456 normally biases the floating block 448 towards the control block 454 and has one end attached to the control block 454 and a second end attached to the base plate 450, which in turn is rigidly attached to the support arm 426.

A servo motor 460 is attached to the base plate 450 and has a lead screw 462 extending through an opening (not shown) in the base plate 450 and through a bore in the control block 454. Movement of the lead screw 462 causes the control block 454, the floating block 448, and the anvil 458 to move horizontally to the left or right depending on the motion of the lead screw 462. Movement of the anvil 458 to the left places force on the biasing point 412 of the mandrel 410. The servo motor 460 is controlled such that movement of the anvil 458 causes the lens blank mounting member 82 to move inward and outward from mandrel 410 at a controlled rate.

Figure 13:
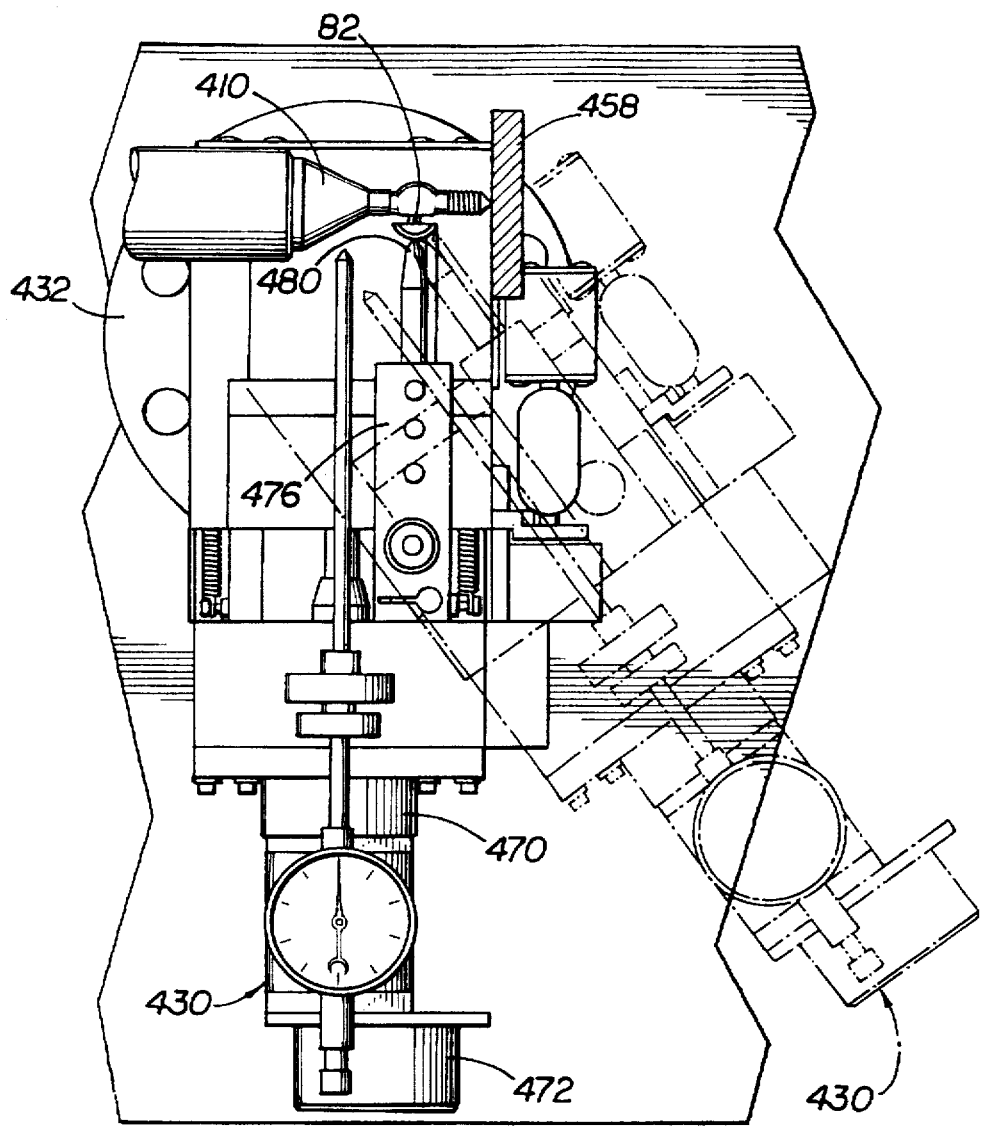
FIG. 13 is a partial top plan view of the lathe along line 12—12 in FIG. 12.
Figure 14:
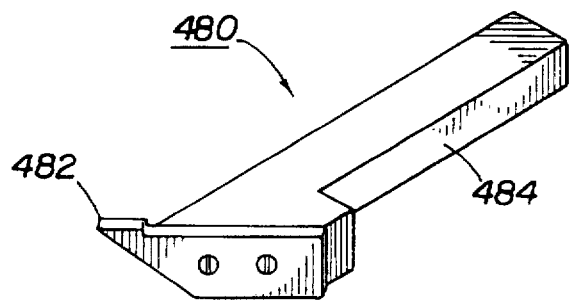
FIG. 14 is a top perspective view of a curing tool used with the lathe.

Referring to FIG. 13, the turret 430 includes a motor 470 and an encoder 472 that is used to generate signals to control the movement of the servo motor 460. The turret 430 also contains a tool holder 476 employed to hold the cutting tool 480. Referring to FIG. 14, a typical cutting tool 480 has a curing point 482 and a body portion 484. Referring back to FIG. 13, the cutting tool 480 may be moved toward or away from the mandrel 410 through control of the tool holder 476. Additionally, the turret 430 may be rotated on the 432 to move the cutting tool 480 in an arc relative to the lens blank mounting member 82 on the mandrel 410. The motor 470 precisely moves the tool holder 476 toward or away from the mandrel 410.

Those skilled in the art will realize that many types of contact lenses may be constructed containing both spherical and aspherical surfaces in which the radii of curvature all have centers of curvature located on the same optical axis. Furthermore, these lenses may have different combinations of spherical and aspherical surfaces to tailor a lens for different users and to correct for the particular vision defects of a contact lens wearer. Therefore, according to the present invention, a bifocal lens, a trifocal lens, or some other multifocal lens may be produced according to the present invention as a ridged gas permeable lens, a soft contact lens, or some other form of plastic contact lens.

FIG. 14 shows a cutting tool 480 used by the lathe. The cutting tool comprises a piece 484 for attaching to the lathe and a cutting tip 482.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A contact lens having a single optical axis, an anterior side and an opposite posterior side adapted to fit against a human cornea, comprising:
   a. a first spherical vision surface disposed laterally across a first portion of the anterior side having a first radius of curvature and a first center of curvature disposed along the single optical axis;
   b. a second spherical vision surface disposed laterally across a second portion of the anterior side and having a second radius of curvature and a second center of curvature disposed along the single optical axis; and
   c. a transition surface disposed laterally across a third portion of the anterior side intermediate the first portion and the second portion and having a plurality of centers of curvature, each center of curvature being disposed along the single optical axis.

2. The contact lens of claim 1, wherein the transition surface comprises a plurality of radii of curvature that continuously vary in length from the first center of curvature to the second center of curvature.

3. The contact lens of claim 1, wherein the transition surface interconnects the first spherical vision surface and the second spherical vision surface.

4. The contact lens of claim 1, wherein the first radius of curvature is different from the second radius of curvature.

5. The contact lens of claim 1, wherein the second spherical vision surface comprises a near vision surface.

6. The contact lens of claim 1, wherein the first spherical vision surface comprises a distance vision surface.

7. The contact lens of claim 1, wherein the transition surface comprises a continuous aspherical surface.

8. A contact lens having a single optical axis and an anterior side, comprising:

a. a plurality of spherical vision surfaces laterally disposed across the anterior side, each spherical surface having a center of curvature disposed on the single optical axis; and b. a plurality of aspherical transition surfaces laterally disposed across the anterior side, each transition surface interconnecting a pair of the spherical vision surfaces and each transition surface having a plurality of centers of curvature disposed on the single optical axis.

9. The contact lens of claim 8, wherein one of the transition surfaces comprises a plurality of radii of curvature that continuously vary in length from a first center of curvature of a first spherical vision surface to a second center of curvature of a second spherical vision surface.

10. The contact lens of claim 8, wherein at least one of the plurality of spherical vision surfaces comprises a near vision surface.

11. The contact lens of claim 8, wherein at least one of the plurality of spherical vision surfaces comprises a distance vision surface.

* * * * *